United States Patent [19]
Omote

[11] Patent Number: 5,130,940
[45] Date of Patent: Jul. 14, 1992

[54] BARREL SHIFTER FOR DATA SHIFTING
[75] Inventor: Kazuyuki Omote, Yokohama, Japan
[73] Assignee: Kabushiki Kaisha Toshiba, Kawasaki, Japan
[21] Appl. No.: 637,689
[22] Filed: Jan. 7, 1991
[30] Foreign Application Priority Data
 Jan. 22, 1990 [JP] Japan .................................. 2-010670
[51] Int. Cl.$^5$ .............................................. G06F 7/38
[52] U.S. Cl. .............................................. 364/715.08
[58] Field of Search ...................... 364/715.01, 715.08, 364/715.07

[56] References Cited
U.S. PATENT DOCUMENTS

4,475,173 10/1984 Talmi .............................. 364/715.08
4,583,197 4/1986 Chappell et al. ................ 364/715.08

Primary Examiner—Long T. Nguyen
Attorney, Agent, or Firm—Foley & Lardner

[57] ABSTRACT

A barrel shifter for successively shifting reference data in a plurality of stages includes a wiring network for every stage to shift the reference data to produce shifted data and selectors connected to the wiring network for every stage except for a specific stage to output either the reference data or the shifted data as new reference data to a following stage while distorting the electric waveform of the selected data. The barrel shifter also includes complex clocked inverters connected to the wiring network in the specific stage to output either the reference data or the shifted data as new reference data to a following stage while correcting the electric waveform of the selected data.

2 Claims, 7 Drawing Sheets

| 2 BITS SHIFTING CONTROL SIGNAL | INVERTED 2 BITS SHIFTING CONTROL SIGNAL | REFERENCE CODE | 2 BITS SHIFTED CODE | OUTPUT CODE |
|---|---|---|---|---|
| H | L | H | H | L |
|  |  | H | L | H |
|  |  | L | H | L |
|  |  | L | L | H |
| L | H | H | H | L |
|  |  | H | L | L |
|  |  | L | H | H |
|  |  | L | L | H |

BARREL SHIFTER FOR DATA SHIFTING

BACKGROUND OF THE INVENTION

1. Field of the Invention

The present invention relates to a barrel shifter in which the operating time can be greatly reduced and increase of the cell array area can be suppressed at the minimum value.

2. Description of the Background Art

Recently, a barrel shifter in which data composed of a binary code series are received in parallel and provided in parallel after shifted at will by a desired number of bits has been utilized for an arithmetical unit for LSI (Large Scale Integration).

Figure 1:
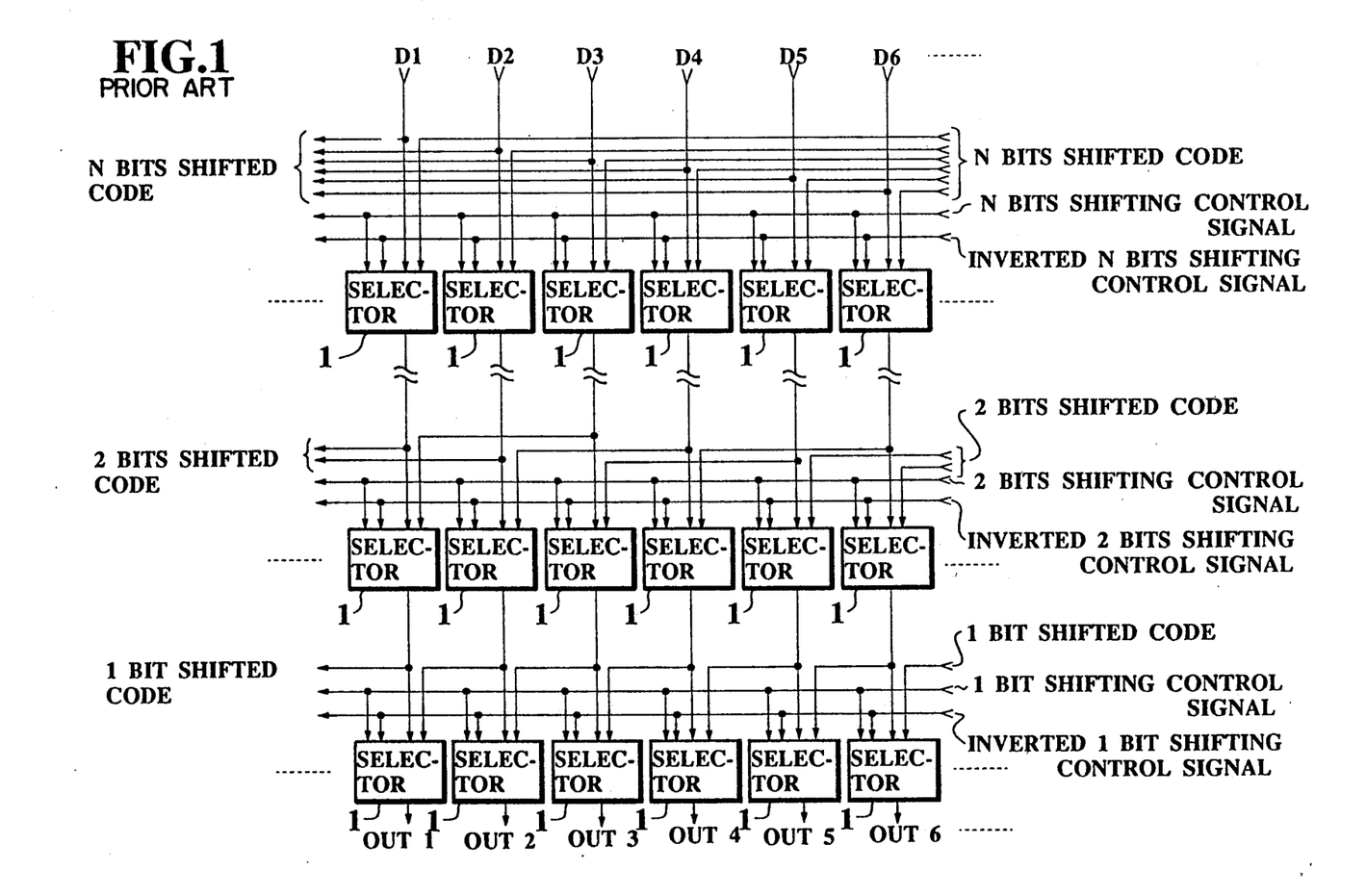
FIG. 1 shows a block diagram of the hardware.

FIG. 1 shows a block diagram of a cell array section of a conventional barrel shifter having i stages (i is an integer satisfying $1 \leq i$).

As shown in FIG. 1, in the barrel shifter composed of i stages, a plurality of selectors 1 are arranged in parallel correspondingly to each bit of an input data formed of a binary code series of D1, D2, ..., further interconnected in series so as to construct i stages. To each of the selectors 1, a corresponding binary code and another binary code different from the former binary code by a predetermined bit number are received, and one of these two codes is selected and provided in such a manner as described later. For example, a k-bit-shifting (k is an optional integer and satisfies $1 \leq k$) control signal for the m-th stage, an inverted-k-bit-shifting control signal obtained by inverting the k-bit-shifting signal, a reference code from a selector 1 of the (m+1)th stage located just above the selector 1 of the m-th stage in FIG. 1 and a binary code (k-bit-shifted code) different from the reference code by k bits and given from a selector 1 which is located at the k-th position in the right direction from the selector 1 of the (m+1)th stage in FIG. 1 and provides the reference code, are received to a selector 1 of the m-th ($1 \leq m \leq i$) stage.

Moreover, the selector 1 of the m-th stage provides a binary code selected by its operation to a selector 1 of the (m−1)th stage located just below in FIG. 1 and a selector 1 located at the j-th position (j is an optional number and satisfies $1 \leq j$) in the left direction from the selector 1 of the (m−1)th stage in FIG. 1.

To each of selectors 1 of the i-th stage located at the top stage in FIG. 1, a corresponding binary code, that is, a reference code and another binary code different from the reference code by n bits, that is, an n-bit-shifted code are selectively received from the binary code series of D1, D2, ....

On the other hand, a binary code series of OUT1, OUT2, ..., provided from respective selectors 1 of the first stage located at the bottom stage in FIG. 1, composes an output data.

Figure 2:
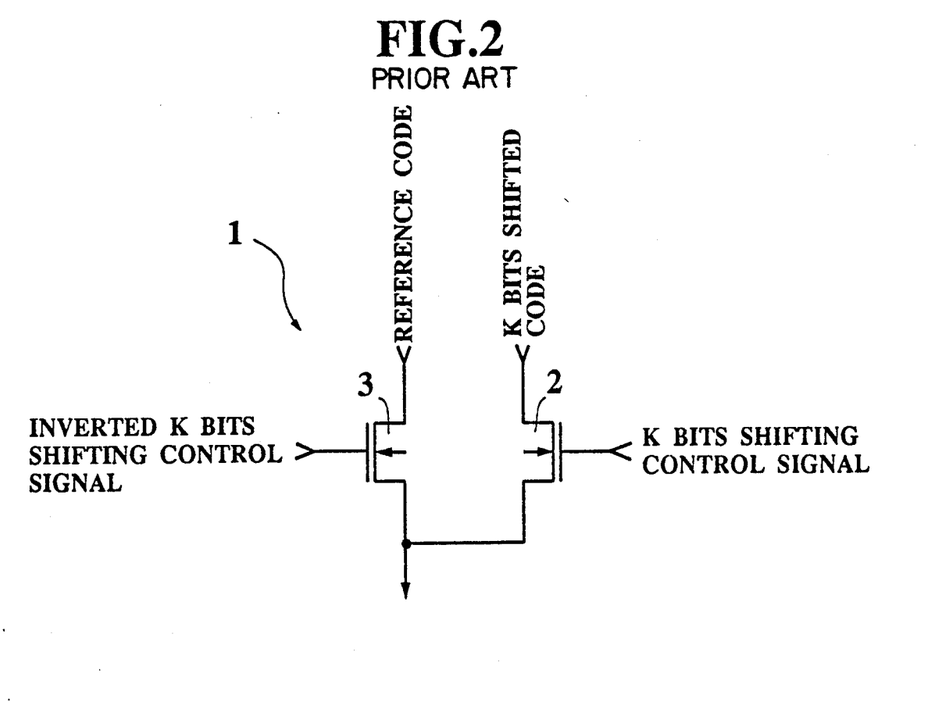
FIG. 2 is a circuit diagram of a selector composed of a transfer gate.

For example, as shown in FIG. 2, the selector 1 of the m-th stage is composed of a transfer gate in which two N channel MOS type FET transistors (hereinafter called Nch) 2, 3 are connected in parallel. And the k-bit-shifted code is received to a source of the Nch2, while the k-bit-shifting control signal is received to a gate of the Nch2. On the other hand, the reference code is received to a source of the Nch3, while the inverted-k-bit-shifting control signal is received to a gate of the Nch3.

In such construction of the selector 1, when the k-bit-shifting control signal is at the "H" level (for example, at a positive power-source potential), only a channel between the source and the drain of the Nch 2 to which the signal is received is turned on, so that the k-bit-shifted code is provided. To the contrary, when the k-bit-shifting control signal is at the "L" level (for example, 0 potential), since the inverted-k-bit-shifting control signal is at the "H" level, only a channel between the source and the drain of the Nch 3 to which the inverted signal is received is turned on, so that the reference code is provided.

Namely, the selector 1 selects and provides the k-bit-shifted code or the reference code under control of the k-bit-shifting control signal.

Returning to FIG. 1, the operation of a barrel shifter in which the selectors 1 operated in the above manner are respectively arrayed in series so as to construct i stages is explained.

Each of selectors 1 of the i-th stage located at the top stage receives the reference code and the n-bit-shifted code which is different from the reference code by n bits in the binary code series of D1, D2, ....

In other words, the group of selectors 1 of the i-th stage receives a reference data composed of the binary code series of D1, D2, ... and a n-bit-shifted data which is shifted by n bits from the reference data.

Then, each selector 1 of the i-th stage selects the reference code or the n-bit-shifted code under control of the n-bit-shifting control signal or the inverted-n-bit-shifting control signal.

In other words, since all of the selectors 1 of the i-th stage receive the same n-bit-shifting control signal and the same inverted-n-bit-shifting control signal, the group of selectors 1 selects either the reference data or the n-bit-shifted data.

Then, each selector 1 of the i-th stage provides each selected binary code to each selector 1 of the (i−1)th stage located just below in FIG. 1 and each of another selectors 1 located at the h-th position (h is an optional integer satisfying $1 \leq h$) in the left direction from the former selector 1 of the (i−1)th stage in FIG. 1.

Namely, each of the selectors 1 of the (i−1)th stage receives the binary code selected and provided from the selector 1 in the i-th stage just above in FIG. 1 as a new reference code and another binary code provided from a selector 1 of the i-th stage located at the h-th position in the right direction from the former selector 1 of the i-th stage in FIG. 1 as an h-bit-shifted code which is shifted from the reference code by h bits.

In other words, the group of selectors 1 of the i-th stage provides a data selected by its operation as a new reference data and an h-bit-shifted data respectively shifted by h bits from the new reference data to the group of selectors 1 of the (i−1)th stage.

In such a manner, each selector 1 of each stage selects either the received reference code or the k-bit-shifted code under control of the k-bit-shifted control signal and the inverted k-bit-shifted control signal, and provides the selected binary code as a new reference code to a selector 1 in the following stage and provides the same code as a j-bit-shifted code to another different selector from the former selector in the same following stage.

In other words, each group of selectors 1 of each stage selects either the reference data or the shifted data shifted by an optional number of bits from the reference data, and provides the selected data and the shifted data shifted by an optional number of bits from the selected data to the following stage one after another. Moreover, the group of selectors 1 of the bottom stage provides the selected data composed of the binary code series of OUT1, OUT2, . . . as an output data.

The output data coincides with the data obtained by shifting the input data composed of the binary code series of D1, D2, . . . by the total bit number defined by summing up each predetermined bit number shifted by every group of the selectors 1 in each stage.

Accordingly, by using the above-mentioned construction in which the selectors 1 respectively composed of transfer gates of Nch are arranged in order in a matrix form, it becomes possible to form a barrel shifter having a compact shape and it is capable of shifting a data by a desired number of bits.

Figure 3:
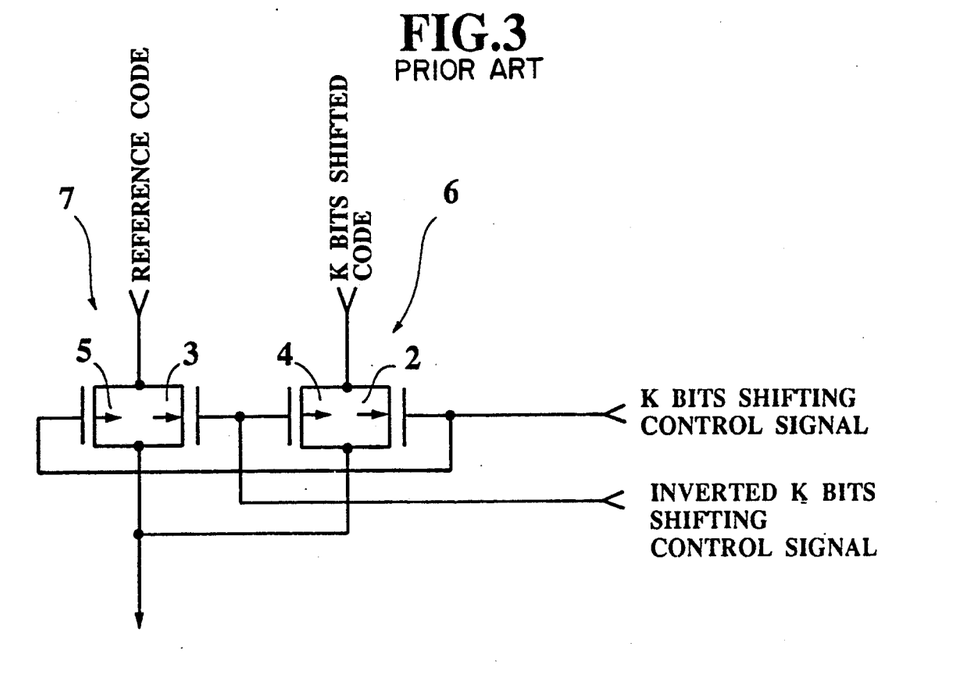
FIG. 3 is a circuit diagram of a selector composed of a pass transistor.

As shown in FIG. 3, it is possible to use a pass transistor as each selector 1 in place of the transfer gate shown in FIG. 2. Namely, in such a pass transistor, P channel MOS type FET transistors (called Pch hereinafter) 4, 5 are respectively connected in parallel with the Nch 2, 3 to compose circuits 6, 7 which are connected in parallel to each other.

In this case, since the pass transistor has the Pch in which the so-called back gate effect is not generated, when a binary code received to the selector 1 is at the "H" level (for example, a power-source potential), the electric potential of a code to be provided therefrom reaches the power-source potential so that the binary code can be transmitted rapidly and reliably.

However, in such a barrel shifter as composed of selectors each of which uses the transfer gate or the pass transistor, when the number of stages of the selectors arranged in series is increased, the distortion of output codes becomes remarkable. As a result, the operating time of the barrel shifter is greatly increased and the processing speed of the input data is declined.

Figure 4:
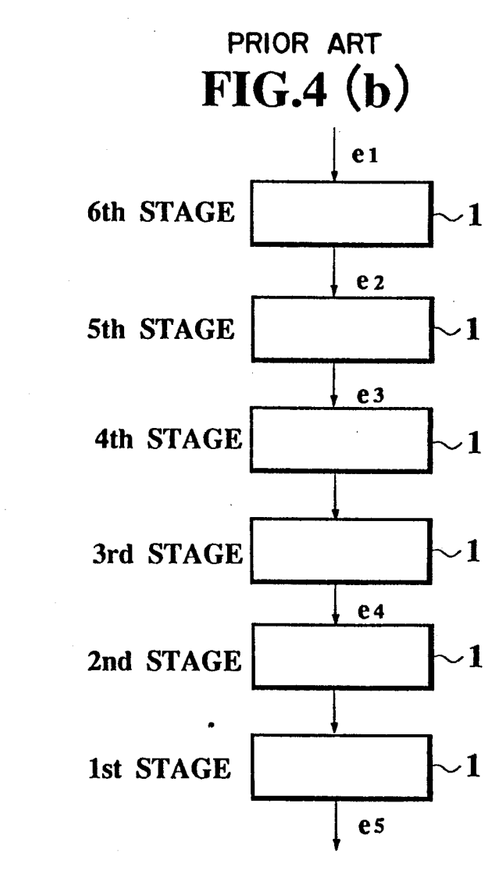

For example, FIG. 4a shows input/output waveforms when an edge signal is received from a pass transistor of the sixth stage in a barrel shifter composed of six stages.

As shown in FIG. 4b, the horizontal axis shows the elapsed time (nsec), and the vertical axis shows the voltage (volt) of output signals obtained in each stage. Moreover, a signal e1 designates an input edge signal, a signal e2 designates a signal provided from the pass transistor of the sixth stage in which the signal e1 is received. In other words the signal e2 designates an input signal to a pass transistor of the fifth stage. Similarly, a signal e3 designates an output signal from the pass transistor of the fifth stage. In other words, the signal e3 designates an input signal to a pass transistor of the fourth stage, and e4 designates an output signal from a pass transistor of the third stage. In other words, the signal e4 designates an input signal to a pass transistor of the second stage, moreover a signal e5 designates an output signal from a pass transistor of the first stage which is the final stage of the barrel shifter.

Each of the Nch has a channel length of 1 $\mu$m and a channel width of 3 $\mu$m, While each of the Pch has a channel length of 1 $\mu$m and a channel width of 5 $\mu$m. Moreover, the power source voltage is 4.5 volt.

As shown in FIG. 4b, the signal e1 rises up sharp. However, it is also seen from the same drawing that the each waveform of the signals is gradually distorted every time the signal passing through each stage.

For example, as the logic criteria in this case, when the voltage set in the range from 0 to 2.5 volt is an "L" level, while the voltage set in the range from 2.5 to 4.5 volt is an "H" level, the input signal e1 which starts to rise up at t0=15 nsec exceeds the voltage of 2.5 volt at t1=17 nsec, while the output signal e5 exceeds the voltage of 2.5 volt at t5=26 nsec. Accordingly, the operating time in the six stages of selectors is obtained as 9 nsec defined by the value of t5−t1.

The reason why each signal waveform rises relatively sharp in the vicinity of 2.4 volt is because the Pch cause no back gate effect.

Moreover, the reason why the waveform is gradually distorted is that each of the transistors respectively forming the selectors has an internal resistance, an internal electrostatic capacitance and a wiring capacitance. Hereinafter, the influence of the resistance and the capacitance is explained in detail with reference to FIGS. 5a and 5b.

Figure 5:
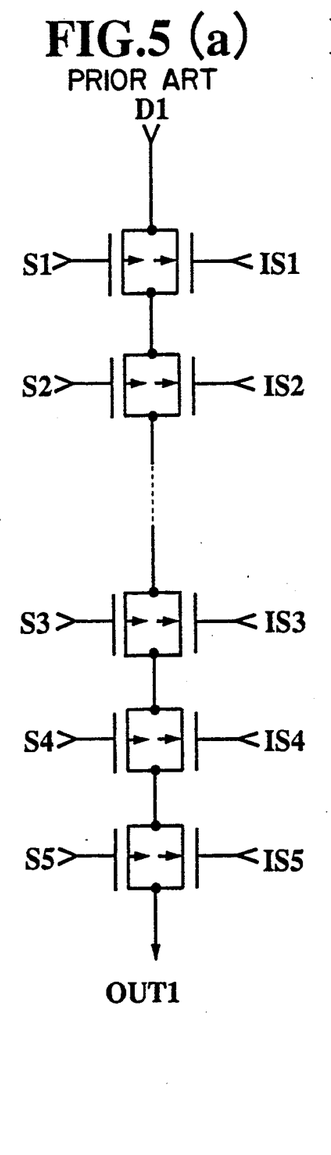

FIG. 5a is an explanatory diagram to show a transmission route of a shifted data when the barrel shifter is composed of selectors using the pass transistors. For convenience, the same drawing shows a circuit in which only the circuits 7 in the circuits 6, 7 composing the series of selectors are connected in series.

As shown in FIG. 5a, in the circuit connecting selectors in series, shifting control signals S1, S2, . . . are respectively received to the gates of Pch 5, and the inverted signals IS1, IS2, . . . obtained by inverting the control signals are respectively received to the gates of Nch 3. In such a state, the binary code D1 is received to a source of a pair of Nch-Pch of the top stage in FIG. 5a, then the binary code OUT1 is provided from a drain of the pair of Nch-Pch of the bottom stage in FIG. 5a.

From the viewpoint of the internal resistance, the internal electrostatic capacitance and the wiring capacitance, the circuit connecting selectors in series can be regarded as a circuit composed of RC circuits connected in series with each other as shown in FIG. 5b.

Accordingly, when the number of stages composed of selectors is increased, the delay time caused by the respective RC circuits is increased, so that the distortion of the output code OUT1 becomes considerably large.

The improvement to optimize the size of the transistor and reduce the delay time has been tried. However, when the signal of the "H" level is transmitted rapidly, it is necessary to enlarge the size of the Pch transistor reasonably. Accordingly, though the optimization of size is possible to some extent, it is necessary to increase the area of the barrel shifter drastically on the whole.

Figure 6:
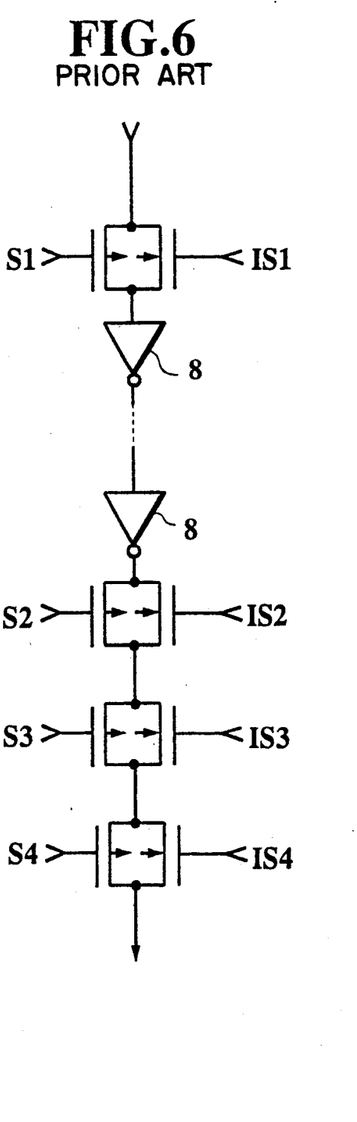

Moreover, to avoid the distortion of the binary code transmitted through the stages of the selectors, there is a known method in which for example, two stages of drivers 8 are inserted in the series of stages as shown in FIG. 6 to shape the waveform of the binary code.

However, when this method is used, since the layout area of the drivers 8 is required in the cell array section of the barrel shifter the method is inconsistent with reality.

SUMMARY OF THE INVENTION

The present invention was made to solve the problem of the prior art, and it is an object to provide a barrel shifter in which the operating time can be greatly reduced even when the number of stages of the selector is increased, and the increase of the cell array area can be suppressed at the minimum value.

To achieve the above object, the barrel shifter according to the present invention comprises a plurality of shift selecting sections respectively connected in series to one another to form a plurality of stages, each of the shift selecting sections including (a) a wiring network for shifting a reference data composed of a series of binary codes by a predetermined number of bits; and (b) a data selecting circuit for receiving shifted data obtained from the wiring network and the reference data in parallel respectively, selecting either of the two kinds of data and providing the selected data as a new reference data;

in which a data selecting circuit being at least one of the shift selecting sections has waveform shaping means for correcting the distortion of the potential waveform of the data which are selected and provided from the other data selecting circuit; and a data received to the shift selecting section of the first stage are respectively shifted by a predetermined number of bits through each shift selecting section of the stages following the first stage one after another, and the resultant shifted data is provided in parallel from the shift selecting section of the final stage.

Preferably, the waveform shaping means is composed by arranging a group of complex clocked inverters every bit of the input data, and each of the complex clocked inverters is constructed by connecting a first clocked inverter and a second clocked inverter in parallel, moreover each of the first and the second clocked inverter is formed by connecting in series an N channel transistor connection section in which two N channel transistors are connected in series to each other with a P channel transistor connection section in which two P channel transistors are connected in series to each other.

Moreover, each complex clocked inverter inverts and drives either the reference data to be received to gates of the first clocked inverter or the shifted data to be received to gates of the second clocked inverter, and provides codes having zero potential or the power-source potential from a node connecting between the N channel transistor connection section and the P channel connection section.

In the barrel shifter having the above-mentioned construction, each of the shift selecting sections obtains a shifted data by shifting the data received thereto as the reference data by a predetermined number of bits at the wiring network thereof, selects either the shifted data or the reference data and provides the selected data as a new reference data.

Moreover, the shift selecting sections are connected in series to form a plurality of stages so that the reference data are successively received to the respective shift selecting sections. As a result, either the reference data or the shifted data obtained by shifting the reference data by a predetermined number of bits are provided.

Namely, each stage of the shift selecting sections independently judges whether the input data are to be shifted or not, so that data shifted by a desirable number of bits is provided in parallel from the data shift section of the bottom stage.

In the binary codes respectively composing the data to be transmitted through the array of the shift selecting sections, the distortion is caused by the internal resistance and the wiring capacitance of transistors constructing the respective data selecting circuits. Accordingly, when the number of serial stages of the shift selecting sections is increased, the processing time required for the binary codes to be changed between the "H" level and the "L" level is increased. This means that the processing speed for the input data is sharply declined in such a case.

Therefore, the waveform shaping means formed by setting the group of the complex clocked inverters are provided in the middle of the series of stages of the shift selecting sections so as not only to select either the series of the binary codes composing the reference data or the series of the binary codes composing the shifted data and provide the selected binary codes, but also to shape each waveform of the binary codes by driving them to correct the distortion of the waveform.

Accordingly, by using the group of the complex clocked inverters, it becomes possible to shape each waveform of the binary codes transmitting each shift selecting section without providing a special area for shaping separately.

BRIEF DESCRIPTION OF THE DRAWINGS

FIGS. 1 to 6 respectively show the prior art of a barrel shifter, wherein

FIG. 4a shows waveforms respectively showing the change of an edge signal transmitted through pass transistors connected in series to form six stages, FIG. 4b shows a serial six stages of selectors used for obtaining the waveforms shown in FIG. 4a.

FIG. 5a is an explanatory diagram to show a state where a plurality of circuits 7 shown in FIG. 3 are connected in series to form a plurality of stages, FIG. 5b is an RC circuit diagram based on a respective internal resistance and a wiring capacitance of the pass transistors shown in FIG. 5a, FIG. 6 is an explanatory diagram to show a state where a plurality of drivers are inserted in a series of the pass transistors shown in FIG. 5a, FIGS. 7 to 10 respectively show a barrel shifter related to one embodiment of the present invention, wherein FIG. 10a shows waveforms, as shown FIG. 4a, to explain the improvement of the distortion of output codes when the complex clocked inverter shown in FIG. 8 are used in the embodiment.

FIG. 10b shows a serial six stages of selectors used for obtaining the waveforms shown in FIG. 10a.

DESCRIPTION OF THE SPECIFIC EMBODIMENT

Hereinafter, the present invention will be described in more detail with reference to the accompanying drawings.

Figure 7:
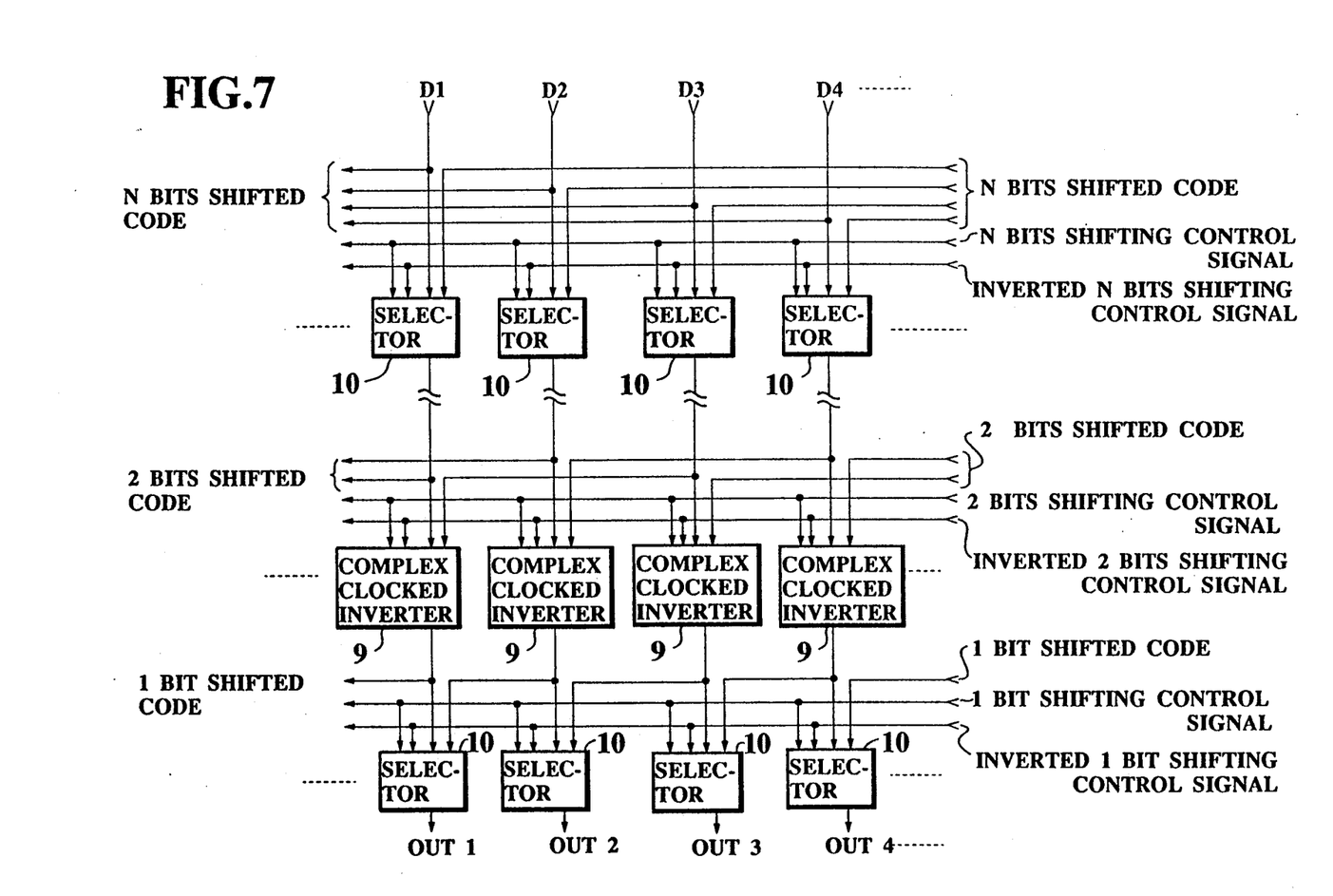
FIG. 7 is a circuit diagram of the hardware.

FIG. 7 shows a block diagram of a cell array portion of a barrel shifter composed of i stages, which is related to one embodiment of the present invention.

As shown in the drawing, the barrel shifter of i stages in this embodiment has the construction in which the selectors 1 of the second stage in the conventional barrel shifter shown in FIG. 1 are replaced with a complex clocked inverter 9, and all the other selectors 1 are replaced with selectors 10 respectively composed of pass transistors.

Figure 8:
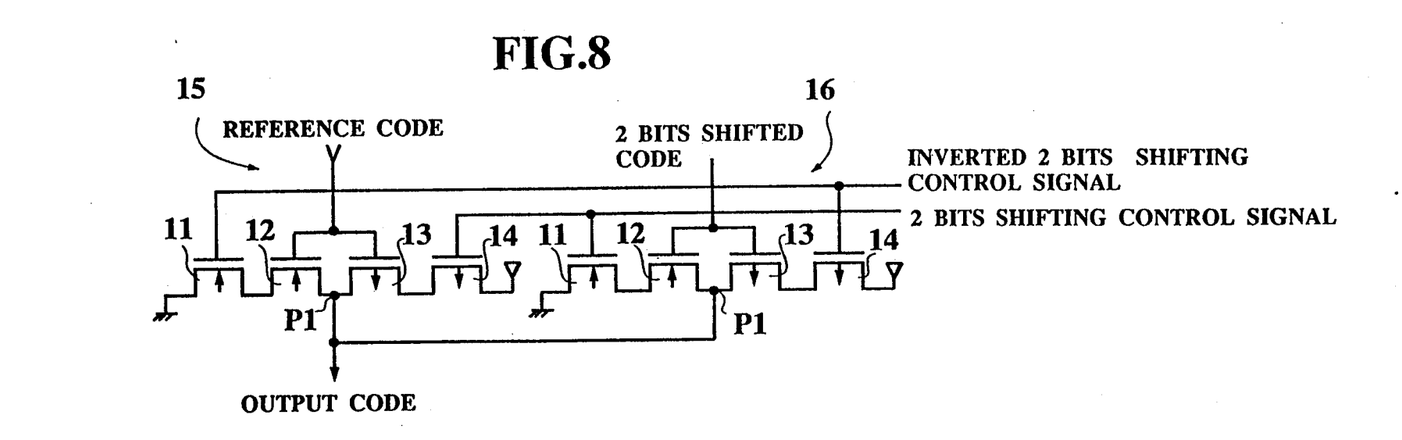
FIG. 8 is a circuit diagram of a complex clocked inverter.

FIG. 8 shows a circuit diagram of the complex clocked inverter 9.

As shown in FIG. 8, the complex clocked inverter 9 has the construction in which a source of an Nch connection section formed by connecting a source of an Nch 11 to a drain of an Nch 12 is connected in series to a drain of a Pch connection section formed by connecting a source of a Pch 13 to a drain of a Pch 14 so as to respectively form a first and second clocked inverters 15, 16 having in common an output node P1 respectively, moreover the first and second clocked inverters 15, 16 are connected to each other in parallel through the output node P1. On addition, the drains of the Nch 11 in the first and second clocked inverters 15, 16 are respectively grounded, and the sources of Pch 14 are respectively connected to the power source.

In this case, a reference code is received to the respective gates of the Nch 12 and the Pch 13 in the first clocked inverter 15, while a 2-bit-shifted code is received to the respective gates of the Nch 12 and the Pch 13 in the second clocked inverter 16.

Moreover, an inverted-2-bit-shifting control signal is received to the gate of the Nch 11 in the first clocked inverter 15 and the gate of the Pch 14 of the second clocked inverter 16, while a 2-bit-shifting control signal is received to the gate of the Pch 14 in the first clocked inverter 15 and the gate of the Nch 11 in the second clocked inverter 16.

Furthermore, an output code as a new reference code is provided from the respective output nodes P1 of the first and second clocked inverters 15, 16.

In such a construction, the operation of the complex clocked inverter 9 is explained with reference to FIG. 9.

Figure 9:
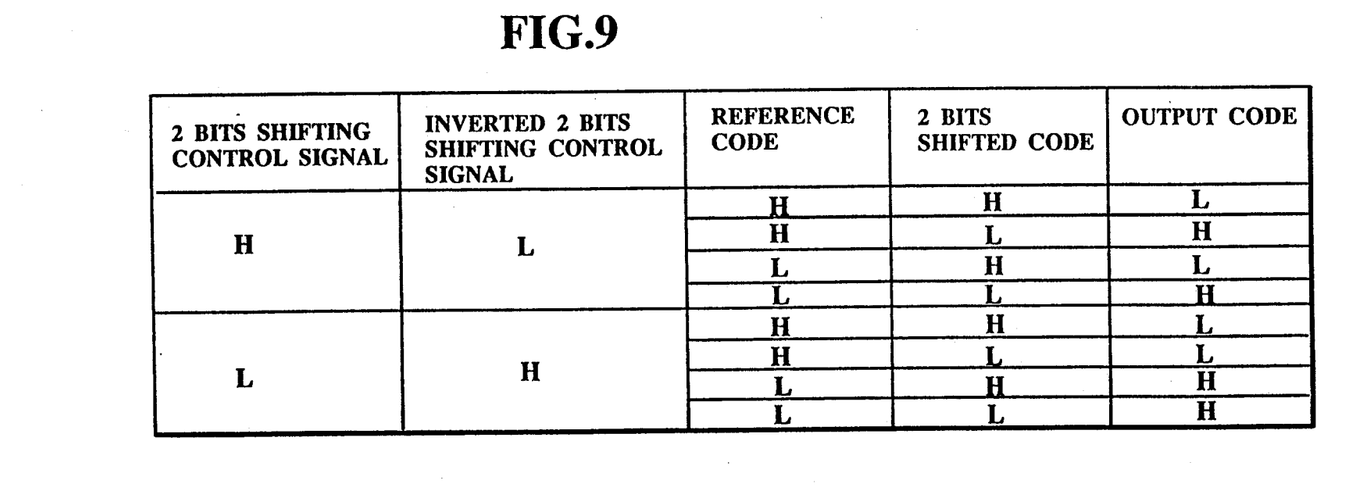
FIG. 9 is an explanatory diagram to show the operation of the complex clocked inverter shown in FIG. 8.

As shown in FIG. 9, when the 2-bit-shifting control signal is at the "H" level (a positive power-source potential), the inverted-2-bit-shifting control signal is at the "L" level (the zero potential), so that the Nch 11 and the Pch 14 in the first clocked inverter 15 are turned off. As a result, the output code from the first clocked inverter 15 is not determined.

On the other hand, the Nch 11 and the Pch 14 in the second clocked inverter 16 are turned on. Thus, when the 2-bit-shifted code is changed from the "L" level to the "H" level, the Nch 12 in the second clocked inverter 16 is turned on while the Pch 13 therein is turned off. Namely, the potential level of the output node P1 of the second clocked inverter 16 becomes the zero potential rapidly, so that the output code is changed into the "L" level with the potential change of the node P1. Conversely, when the 2-bit-shifted code is changed from the "H" level to the "L" level, the Nch 12 of the second clocked inverter 16 is turned off while the Pch 13 thereof is turned on. Namely, the potential level of the output node P1 of the second clocked inverter 16 changes to the power-source potential rapidly, so that the output code is rapidly changed into the "H" level with the potential change of the node P1.

To the contrary, when the 2-bit-shifting control signal is at the "L" level, the inverted-2-bit-shifting control signal is at the "H" level, so that the Nch 11 and the Pch 14 in the first clocked inverter 15 are turned off. As a result, an output code from the second clocked inverter 16 is not determined.

On the other hand, the Nch 11 and the Pch 14 in the first clocked inverter 15 are turned on. Thus, when the reference code is changed from the "L" level to the "H" level, the Nch 12 in the first clocked inverter 15 is turned on while the Pch 13 therein is turned off. Namely, the output node P1 of the first clocked inverter 15 changes to the zero potential rapidly, so that the output code is changed into the "L" level rapidly. Conversely, when the reference code is changed from the "H" level to the "L" level, the Nch 12 in the second clocked inverter 16 is turned off while the Pch therein is turned on. Namely, the output node P1 of the first clocked inverter 15 changes to the power-source potential rapidly, so that the output code is changed into the "H" level rapidly.

Accordingly, in such a complex clocked inverter 9, when the 2-bit-shifting control signal is at the "H" level, an output code having the potential level defined by inverting the potential level of the 2-bit-shifted code can be obtained. To the contrary, when the 2-bit-shifting control signal is at the "L" level, an output code having the potential level defined by inverting the reference code can be obtained. Moreover, the output code is rapidly changed into a potential level equal to the power-source voltage (corresponding to the "H" level) or the zero potential (corresponding to the "L" level).

In other words, the complex clocked inverter 9 has a function for selecting and providing the 2-bit-shifted signal or the reference code under control of the 2-bit-shifting control signal in the same manner as described about the conventional selector 1 shown in FIG. 2 or FIG. 3. Besides, the complex clocked inverter 9 has not only an inverting function for providing the output code defined by inverting the input code but also a drive function for correcting the distortion of the waveform of the output code and determining the potential level thereof at the power-source potential or the zero potential.

Therefore, in the barrel shifter of this embodiment in which the plurality of complex clocked inverters 9 are provided to form the second stage, in the same manner as in the conventional barrel shifter shown in FIG. 1, the input data composed of a binary code series of D1, D2, . . . are shifted by a predetermined number of bits when a shifting control signal is at the "H" level in the selectors 10 or the complex clocked inverter 9. While, when the shifting control signal is at the "L" level, the input data are transmitted to lower stages without being shifted. Then, the selectors 10 of the first stage designated at the bottom in the drawing respectively provide a binary output code series of OUT1, OUT2, . . . .

In the binary code series transmitted from the i-th stage to the third stage, the waveform distortion is caused at each stage by the internal resistance and the internal electrostatic capacitance of the Nch and the Pch included in the selectors 10. The waveform distortion is corrected by the drive function of the complex clocked inverter 9 at the second stage, so that the potential level of the binary codes is rapidly changed, then these codes are transmitted to the pass transistors of the first stage.

Figure 10:
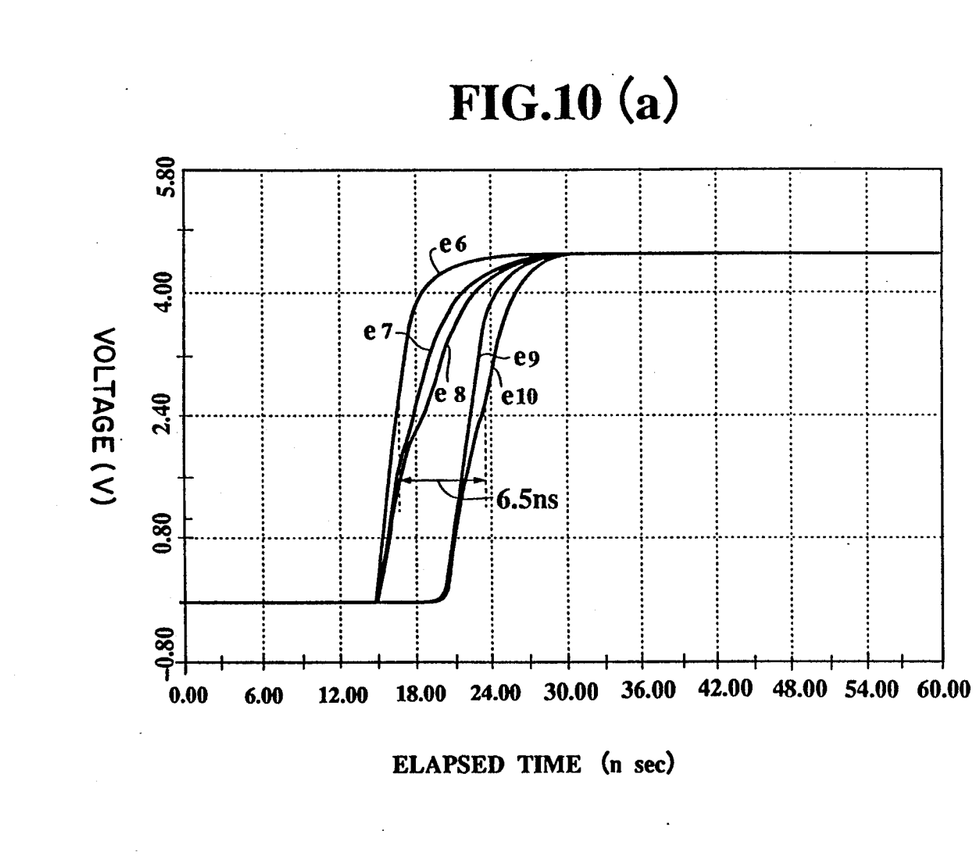

FIG. 10a shows the operation for correcting the waveform distortion by the complex clocked inverter 9.

In the example shown in FIG. 10a, each change of waveforms of input/output signals is shown similarly to the waveforms as shown in FIG. 4a. However, in this example, the pass transistors of the third and the fourth stage in the conventional pass-transistor group of serial six stages shown in FIG. 4a, are respectively replaced with the complex clocked inverter 9.

Namely, as shown in FIG. 10b, a signal e6 shows an edge signal received to the pass transistor 10 of the sixth stage, a signal e7 shows an output signal from the pass transistor 10 of the sixth stage, a signal e8 shows an output signal from the pass transistor 10 of the fifth stage, that is, an input signal to the complex clocked inverter 9 of the fourth stage, a signal e9 shows an output signal from the complex clocked inverter 9 of the third stage, that is, an input signal to the pass transistor 10 of the second stage, and a signal e10 shows an output signal from the pass transistor 10 of the first stage which is the final stage.

The channel length of the Nch used in the example is 1 μm and the channel width thereof is 3 μm, while the channel length of the Pch used in the example is 1 μm and the channel width thereof is 5 μm. Moreover, the powersource voltage is 4.5 volt.

As clearly seen from the comparison with the conventional measurement data shown in FIG. 4a, though the waveform of the signal e8 passing through the selectors of the sixth and the fifth stage is distorted, the waveform of the signal e9 passing through the complex clocked inverter 9 provided to the fourth and the third stages is sharply recovered, so that the operating time can be reduced so much.

Namely, the input signal e7 which starts to rise up at t0=15 nsec exceeds 2.5 volt at t1=17 nsec, while the output signal e10 exceeds 2.5 volt at t10=23.5 nsec. Thus, the operating time in the serial six stages of selectors can be reduced to a value of t10−t1=6.5 nsec.

Accordingly, since the barrel shifter of i stages is provided with the complex clocked inverters 9 for correcting the waveform distortion in the binary codes at the second stage thereof, the logical level of the binary codes can be rapidly changed even when the number of serial stages of the selectors is increased. In other words further the operating time of the barrel shifter can be greatly reduced.

On addition, similarly to each of the conventional selectors 1, since a suitable binary code can be selected from a plurality of binary input codes in each of the complex clocked inverter 9, the complex clocked inverter 9 composing the barrel shifter can be used in place of the conventional selectors 1. Also, the increase of the cell array area of the barrel shifter can be reduced to the minimum value.

In the above construction of the barrel shifter according to the present invention, the selectors 10 respectively composed of pass transistors are connected to form many stages so as to select a desired binary code from a plural of binary codes. However, in place of the pass transistors, it is possible to use transfer gates in the same manner as shown in the conventional barrel shifter as far as the cell array portion can be formed in a small scale. However, in this case, it is thinkable that the processing speed of the data is lowered a little.

Moreover, as described in the barrel shifter presenting the measurement data shown in FIG. 10a, it is possible to replace a plurality of stages of the conventional barrel shifter with a plurality of the complex clocked inverters so as to suppress the delay time and enhance the data processing speed. In this case, since the output signal is not inverted on the basis of the input signal when the complex clocked inverters 9 are so arranged as to form an even number of stages, it is not necessary to provide a group of inverters still more. Thus, such a barrel shifter can be made at low cost in a relatively small scale.

It should be obviously understood that the present invention is not limited to the above embodiment, and suitable modification or alteration can be applied thereto.

What is claimed is:

1. A barrel shifter for successively shifting reference data composed of a series of binary codes, according to shift control signals, in a plurality of stages connected to one another in series, the barrel shifter comprising:

wiring network means, provided for every stage, for shifting the reference data by a predetermined number of bits to produce shifted data;

data selecting means, connected to the wiring network means, for selecting either the reference data or the shifted data produced in the wiring network means according to shift control signals and for distorting an electric waveform of selected data and outputting the selected data as new reference data to a following stage, a data selecting means being provided for every stage except for a specific stage and a final stage;

data selecting and waveform correcting means, connected to the wiring network means in the specific stage, for selecting either the reference data or the shifted data produced in the wiring network means according to shift control signals and for outputting selected data as new reference data to a following stage while correcting an electric waveform of the selected data; and data output means, connected to the wiring network means in the final stage, for outputting either the reference data or the shifted data produced in the wiring network means of the final stage in accordance with the shift control signals.

2. A barrel shifter according to claim 1, wherein:

the data selecting and waveform correcting means includes a plurality of complex clocked inverters corresponding to binary codes of the reference data, and each complex clocked inverter includes both a first clocked inverter for transmitting a reference code of the reference data and a second clocked inverter connected to the first clocked inverter in parallel for transmitting a shifted code of shifted data;

the first clocked inverter being connected to both a ground at one terminal through an n-channel transistor and a power source at another terminal through a p-channel transistor when the complex clocked inverter receives a shift control signal designating selection of the reference code, and outputting either an electric waveform of a high level provided from the power source through the p-channel transistor, which is turned on by a low level reference code, or an electric waveform of a low level provided from the ground through the n-channel transistor, which is turned on by a high level reference code; and the second clocked inverter being connected to both a ground at one terminal through an n-channel transistor and a power source at another terminal through a p-channel transistor when the complex clocked inverter receives a shift control signal designating selection of the shifted code, and outputting either an electric waveform of a high level provided from the power source through the p-channel transistor, which is turned on by a low level shifted code, or an electric waveform of a low level provided from a ground through the n-channel transistor, which is turned on by a high level shifted code.

* * * * *